(12) United States Patent
Fischer

(10) Patent No.: US 9,177,147 B2
(45) Date of Patent: *Nov. 3, 2015

(54) PROTECTION AGAINST RETURN ORIENTED PROGRAMMING ATTACKS

(71) Applicant: Intel Corporation, Santa Clara, CA (US)

(72) Inventor: Stephen A. Fischer, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 13/631,342

(22) Filed: Sep. 28, 2012

(65) Prior Publication Data

US 2014/0096245 A1  Apr. 3, 2014

(51) Int. Cl.
*G06F 21/56* (2013.01)
*H04L 29/06* (2006.01)
*G06F 21/52* (2013.01)

(52) U.S. Cl.
CPC .............. *G06F 21/566* (2013.01); *G06F 21/52* (2013.01); *H04L 63/14* (2013.01)

(58) Field of Classification Search
CPC .................................................. G06F 21/566
USPC .................... 713/168, 187; 726/25
See application file for complete search history.

(56) References Cited

U.S. PATENT DOCUMENTS

| | | | |
|---|---|---|---|
| 5,944,821 A | 8/1999 | Angelo | |
| 6,578,094 B1 | 6/2003 | Moudgill | |
| 6,802,006 B1 * | 10/2004 | Bodrov | 713/187 |
| 6,941,473 B2 | 9/2005 | Etoh et al. | |
| 7,287,283 B1 | 10/2007 | Szor | |
| 7,581,089 B1 | 8/2009 | White | |
| 7,594,111 B2 | 9/2009 | Kiriansky et al. | |
| 7,631,249 B2 * | 12/2009 | Borde et al. | 714/799 |
| 8,566,944 B2 | 10/2013 | Peinado et al. | |
| 2001/0044904 A1 | 11/2001 | Berg et al. | |
| 2002/0144141 A1 | 10/2002 | Edwards et al. | |
| 2003/0145226 A1 * | 7/2003 | Bruton et al. | 713/201 |
| 2007/0180524 A1 | 8/2007 | Choi et al. | |
| 2008/0015808 A1 | 1/2008 | Wilson et al. | |
| 2008/0060077 A1 * | 3/2008 | Cowan et al. | 726/25 |
| 2008/0216175 A1 | 9/2008 | Pike | |
| 2009/0144309 A1 | 6/2009 | Cabrera et al. | |
| 2010/0122088 A1 * | 5/2010 | Oxford | 713/168 |
| 2010/0175132 A1 | 7/2010 | Zawadowskiy et al. | |
| 2011/0145921 A1 | 6/2011 | Mathur et al. | |

(Continued)

OTHER PUBLICATIONS

Roemer, R. et al.; "Return-Oriented Programming: Systems, Languages, and Applications", University of California, San Diego; ACM Transactions on Information and System Security (TISSEC), Mar. 2012, 42 pages.

(Continued)

*Primary Examiner* — Dede Zecher
*Assistant Examiner* — Jason C Chiang
(74) *Attorney, Agent, or Firm* — Trop, Pruner & Hu, P.C.

(57) ABSTRACT

In one embodiment, a processor includes at least one execution unit. The processor also includes a Return Oriented Programming (ROP) logic coupled to the at least one execution unit. The ROP logic may validate a return pointer stored on a call stack based on a secret ROP value. The secret ROP value may only be accessible by the operating system.

24 Claims, 10 Drawing Sheets

(56) References Cited

U.S. PATENT DOCUMENTS

| | | | |
|---|---|---|---|
| 2011/0277035 | A1 | 11/2011 | Singh et al. |
| 2012/0030758 | A1 | 2/2012 | van den Berg et al. |
| 2012/0167120 | A1 | 6/2012 | Hentunen |
| 2012/0297485 | A1 | 11/2012 | Maeda et al. |
| 2013/0014221 | A1 | 1/2013 | Moore et al. |
| 2013/0036464 | A1* | 2/2013 | Glew et al. ............... 726/22 |
| 2013/0117843 | A1* | 5/2013 | Komaromy et al. ........ 726/22 |
| 2013/0185792 | A1* | 7/2013 | Balakrishnan et al. ..... 726/22 |
| 2014/0020092 | A1* | 1/2014 | Davidov .................... 726/22 |
| 2014/0075556 | A1* | 3/2014 | Wicherski ................. 726/23 |
| 2014/0096247 | A1 | 4/2014 | Fischer |
| 2014/0123281 | A1 | 5/2014 | Fischer |
| 2014/0123286 | A1 | 5/2014 | Fischer |

OTHER PUBLICATIONS

Buchanan, E. et al., "Return-Oriented Programming: Exploitation Without Code Injection", University of California, San Diego; Presentation at Black Hat USA 2008 Briefings, Aug. 2008, 53 pages.

Zovi, D., "Return-Oriented Exploitation"; Presentation at Black Hat USA 2010 Briefings, Jul. 2010, 91 pages.

U.S. Patent Trademark Office, Office Action mailed on Mar. 23, 2015 and Reply filed on May 21, 2015, in U.S. Appl. No. 13/631,342.

Vasilis Pappas, 'kBouncer: Efficient and Transparent ROP Mitigation', Apr. 1, 2012, Retrieved from http://www.cs.columbia.edu/~vapappas/papers/kbouncer.pdf See pp. 1-2, 5-6.

Liwei Yuan et al.,'Security Breaches as PMU Deviation: Detecting and Identifying Security Attacks Using Performance Counters', In: Proceedings of the Second Asia-Pacific Workshop on Systems, Shanghai, China, Jul. 11-12, 2011, Article No. 6 See pp. 1-3, 5.

International Searching Authority, "Notification of Transmittal of the International Search Report and the Written Opinion of the International Searching Authority," mailed Nov. 14, 2013, in International application No. PCT/US2013/048531.

Crispin Cowan, et al., "StackGuard: Automatic Adaptive Detection and Prevention of Buffer-Overflow Attacks," 7th USENIX Security Symposium, Jan. 26-29, 1998, pp. 1-15.

Lucas Davi, et al., "ROPdefender: A Detection Tool to Defend Against Return-Oriented Programming Attacks," Proceedings of the 6th ACM Symposium on Computer and Communications Security Information, 2011, pp. 40-51.

Lu, et al., "deROP: Removing Return-Oriented Programming from Malware," Dec. 2011, ACSAC 2011, pp. 363-372.

Shacham, "The Geometry of Innocent Flesh on the Bone: Return-into-libc Without Function Calls (on the x86)," Nov. 2007, pp. 552-561.

Checkoway, et al., "Return-Oriented Programming with Returns," Oct. 2010, pp. 559-572.

U.S. Patent and Trademark Office, Final Office Action mailed Nov. 26, 2014, with Request for Continued Examination filed Feb. 25, 2015, in U.S. Appl. No. 13/799,612.

U.S. Patent and Trademark Office, Office Action mailed Aug. 7, 2014, with Reply filed Nov. 6, 2014, in U.S. Appl. No. 13/799,612.

U.S. Patent and Trademark Office, Office Action mailed Nov. 14, 2014, with Reply filed Mar. 11, 2015, in U.S. Appl. No. 13/664,532.

U.S. Patent and Trademark Office, Office Action mailed Mar. 12, 2014, with Reply filed Jun. 12, 2014, in U.S. Appl. No. 13/664,532.

U.S. Patent and Trademark Office, Final Office Action mailed Nov. 14, 2014, with Request for Continued Examination filed Mar. 11, 2015, in U.S. Appl. No. 13/799,663.

U.S. Patent and Trademark Office, Office Action mailed Mar. 14, 2014, with Reply filed Jun. 12, 2014, in U.S. Appl. No. 13/799,663.

* cited by examiner

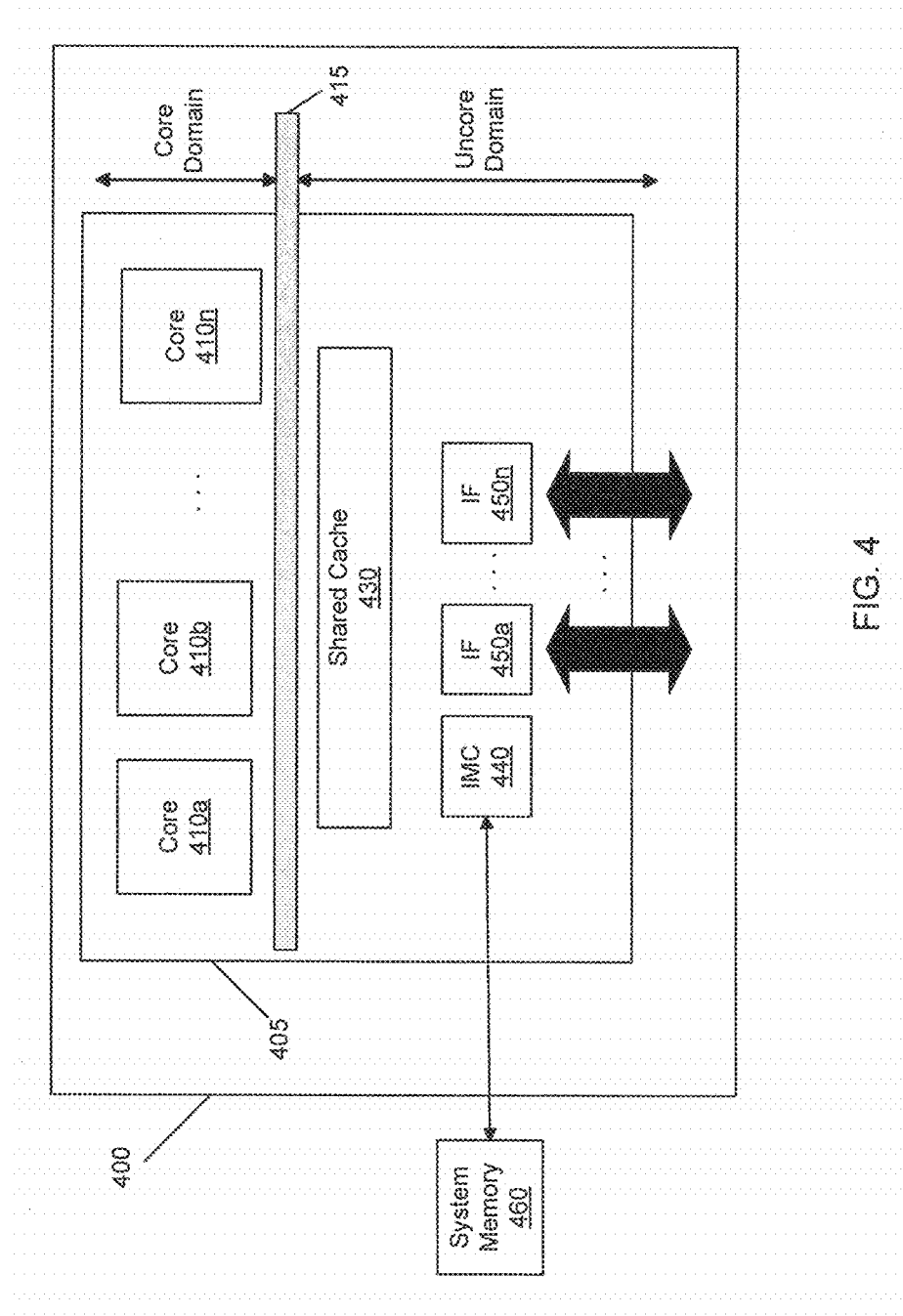

PROTECTION AGAINST RETURN ORIENTED PROGRAMMING ATTACKS

BACKGROUND

Embodiments relate generally to computer security.

Computer exploits are techniques which may be used to compromise the security of a computer system or data. Such exploits may take advantage of a vulnerability of a computer system in order to cause unintended or unanticipated behavior to occur on the computer system. For example, Return Oriented Programming (ROP) exploits may involve identifying a series of snippets of code that are already available in executable memory (e.g., portions of existing library code), and which are followed by a return instruction (e.g., a RET instruction). Such snippets may be chained together into a desired sequence by pushing a series of pointer values onto the call stack. In this manner, an attacker may create a virtual code sequence without requiring injection of external code.

BRIEF DESCRIPTION OF THE DRAWINGS

FIG. 4 is a block diagram of a processor in accordance with an embodiment of the present invention.

DETAILED DESCRIPTION

In accordance with some embodiments, protection against Return Oriented Programming (ROP) attacks may be provided. In one or more embodiments, a return pointer may be pushed on a call stack along with a check value. In some embodiments, the check value may be generated using a secret value that is only accessible by the operating system. Further, upon popping the return pointer off the call stack, the return pointer may be validated using the check value.

Figure 1A:
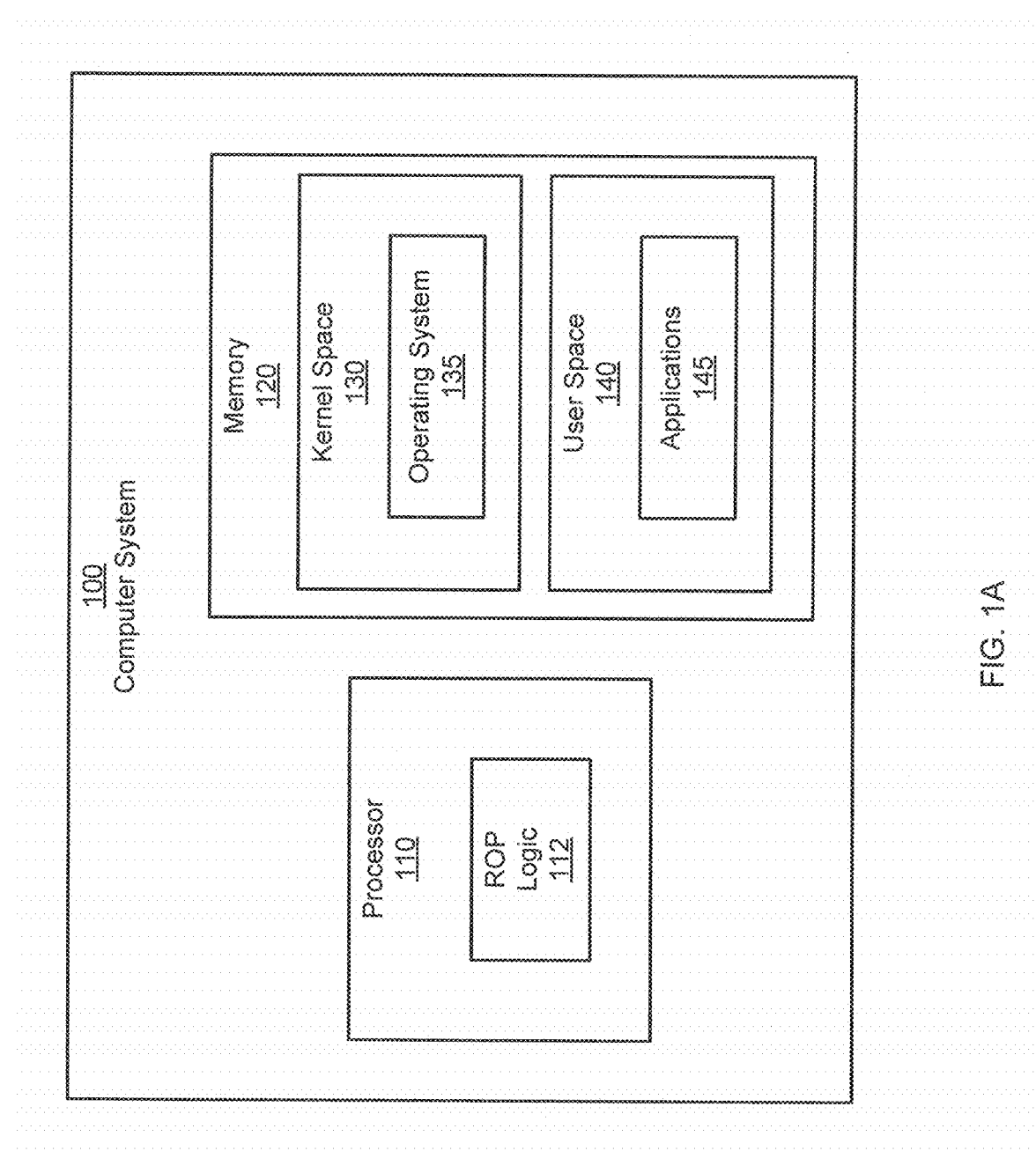
FIGS. 1A-1B are block diagrams of systems in accordance with one or more embodiments.

Referring to FIG. 1A, shown is a block diagram of a system 100 in accordance with one or more embodiments. As shown in FIG. 1A, the system 100 may include a processor 110 and memory 120. In accordance with some embodiments, the system 100 may be all or a portion of any electronic device, such as a cellular telephone, a computer, a server, a media player, a network device, etc.

In accordance with some embodiments, the memory 120 may include a kernel space 130 and a user space 140. In one or more embodiments, the kernel space 130 may be reserved for an operating system (OS) 135. For example, the kernel space 130 may correspond to one or more high-privilege domains (e.g., ring 0) of a hierarchical protection domain scheme, and may be used to run the kernel, kernel extensions, device drivers, etc.

In one or more embodiments, the user space 140 may be reserved for one or more applications 145. For example, in some embodiments, the user space 140 may correspond to a low privilege domain (e.g., ring 3) of a hierarchical protection domain scheme.

In accordance with some embodiments, the processor 110 may include ROP logic 112. In some embodiments, the ROP logic 112 may include functionality to protect against ROP attacks. Such functionality is described further below with reference to FIGS. 1B, 2A-2D, and 3A-3B.

In one or more embodiments, the ROP logic 112 may be selectively enabled or disabled based on a control flag of the processor 110. For example, in some embodiments, the processor 110 may include a control register bit to indicate whether the ROP logic 112 is enabled.

In one or more embodiments, the ROP logic 112 may be implemented in any form of hardware, software, and/or firmware. For example, the ROP logic 112 may be implemented in microcode, programmable logic, hard-coded logic, control logic, instruction set architecture, processor abstraction layer, etc. Further, the ROP logic 112 may be implemented within the processor 110, and/or any other component accessible or medium readable by processor 110, such as memory 120. While shown as a particular implementation in the embodiment of FIG. 1A, the scope of the various embodiments discussed herein is not limited in this regard.

Figure 1B:
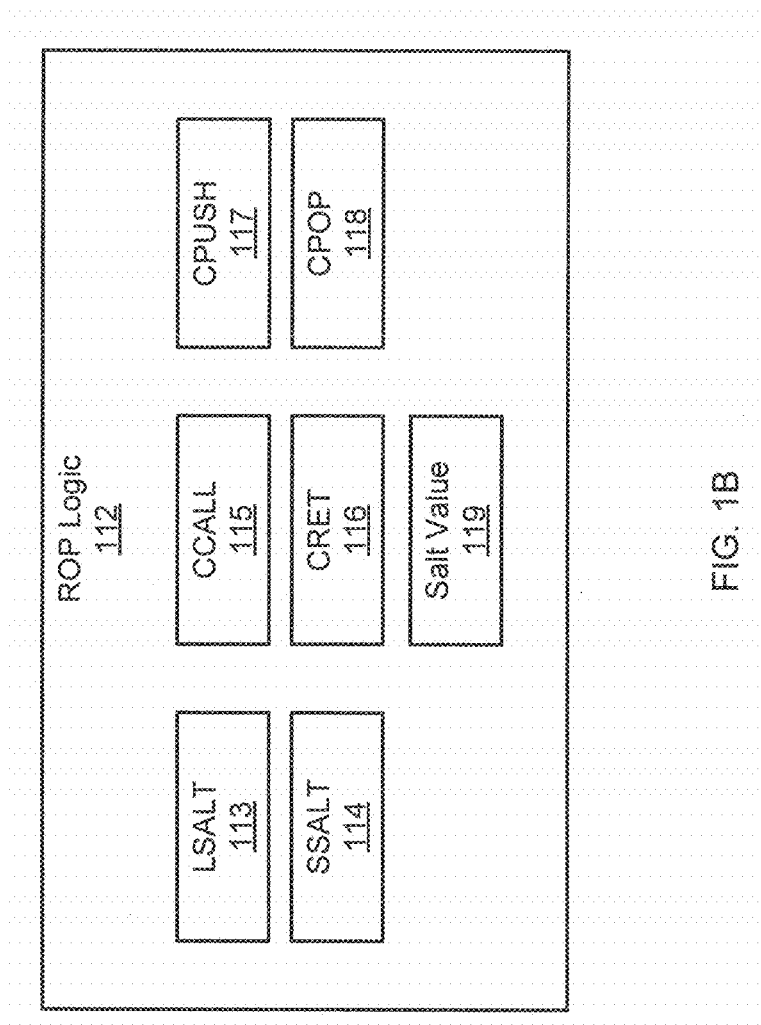

Referring to FIG. 1B, shown is a block diagram of the ROP logic 112 in accordance with one or more embodiments. As shown, in some embodiments, the ROP logic 112 may include various instructions 113-118. In one or more embodiments, the instructions 113-118 may be defined within an instruction set architecture (ISA).

In one or more embodiments, the LSALT instruction 113 may generate a salt value 119. As used herein, the term "salt value" refers to a secret ROP value (i.e., a secret value used for ROP protection) that is only accessible to the OS 135. Thus, in some embodiments, the applications 145 may be unable to access the salt value 119. In some embodiments, the LSALT instruction 113 may generate the salt value 119 based on a random number or function (e.g., a RDRAND instruction). Further, in one or more embodiments, the SSALT instruction 114 may store the salt value 119 in a secure location (e.g., a protected register, a protected memory space, etc.) that is only accessible to the OS 135.

In one or more embodiments, the LSALT instruction 113 and the SSALT instruction 114 may be reserved for use by the OS 135 (e.g., ring 0), and are thus not available to the applications 145. Further, in one or more embodiments, the OS 135 may use the LSALT instruction 113 and the SSALT instruction 114 to generate and store a new salt value 119 at the beginning of a new session (e.g., at system boot-up, at an instantiation of a virtual machine, a run time, etc.). In such embodiments, the salt value 119 may also be stored in one or more fields associated with context switching (e.g., XSAVE, XSAVEOPT, XRSTOR, etc.). In this manner, when switching between different contexts, the OS 135 may access the particular salt value 119 associated with the current context.

In accordance with some embodiments, the strength of the salt value 119 may be based on a ROP security level. In some embodiments, the ROP security level may be predefined as a desired level of protection against ROP attacks (e.g., low, medium, high, etc.). For example, in some embodiments, the width of the salt value 119 may be increased to obtain a relatively high ROP security level, and may be decreased to obtain a relatively low ROP security level. In such embodiments, the LSALT instruction 113 may generate a salt value 119 having a particular width corresponding to the ROP security level.

In one or more embodiments, the ROP security level may be based on a level of functionality associated with the ROP logic 112 (e.g., hardware capabilities, encryption robustness, etc.). In some embodiments, the level of functionality associated with the ROP logic 112 may be specified by a system parameter. Further, in one or more embodiments, the ROP security level may also be based on level(s) of ROP functionality associated with the OS 135 and/or the applications 145. For example, in the event that the levels of functionality associated with the ROP logic 112 and the OS 135 are different, the ROP security level may be set to the lower of the two levels. In this manner, some level of ROP protection may be provided even if different generations of ROP protection are implemented in hardware or software.

In one or more embodiments, the ROP security level may be selectively adjusted based on a desired level of performance of the system 100. For example, in some embodiments, the ROP security level may be decreased if a high performance level is desired for the system 100. Further, in some embodiments, the ROP security level may be increased if the system 100 is not required to perform at a high performance level.

In one or more embodiments, the LSALT instruction 113 and/or the SSALT instruction 114 may use an operand including the salt value 119 and an indication of a ROP security level. Referring now to FIG. 2C, shown is an example operand 250 in accordance with some embodiments. As shown, in this example, the operand 250 may include an 8 bit portion to store the indication of a ROP security level. Further, the operand 250 may include an 120 bit portion to store salt values 119 of various lengths. Note that, in this example, the salt value 119 is less than 120 bits wide, and thus the remainder of the allocated 120 bits is unused. In accordance with some embodiments, the width of the operand 250 may conform to a standard operand width (e.g., an operand width associated with the processor 110), or to a multiple thereof. For example, in some embodiments, the width of the operand 250 may be 64 bits, 128 bits, etc. Note that the example shown in FIG. 2C is only provided for the sake of illustration, and is not intended to limit any embodiments. For example, it is contemplated that the operand 250 may be configured in any other manner. In another example, it is contemplated that the LSALT instruction 113 and/or the SSALT instruction 114 may use separate operands for the salt value 119 and the ROP security level.

Referring again to FIG. 1B, in some embodiments, the CCALL instruction 115 may perform a checked subroutine call using the salt value 119. Further, in one or more embodiments, the CRET instruction 116 may perform a checked return using the salt value 119. In some embodiments, access to the CCALL instruction 115 and the CRET instruction 116 may not be restricted based on protection rings, and may thus be available for use by the applications 145. In one or more embodiments, the CCALL instruction 115 and/or the CRET instruction 116 may use an operand for ROP security level.

The functionality of the CCALL instruction 115 and the CRET instruction 116 is described as follows with reference to FIG. 2A-2B, in accordance with one or more embodiments. Assume that, in the example shown in FIG. 2A, the call stack 200 grows in a downward direction, starting at position A. Assume further that, at the start of this example, a parent routine is executing. Thus, the stack pointer 240 is initially located at a parent routine frame 210 (i.e., position B), corresponding to data associated with the parent routine.

Next, assume that the parent routine calls a subroutine using the CCALL instruction 115 (shown in FIG. 1B), and thus execution shifts from the parent routine to the subroutine. In one or more embodiments, the CCALL instruction 115 may push a return pointer 220 onto the stack 200 at position C. Accordingly, as shown in FIG. 2A, the stack pointer 240 moves to position C. In some embodiments, the return pointer 220 may indicate an address within the parent routine which immediately follows the call to the subroutine.

In one or more embodiments, the CCALL instruction 115 may also push a check value 230 onto the stack 200 after the return pointer 220 (e.g., at position D). In some embodiments, the check value 230 may be associated with the return pointer 220, and may serve to validate the return pointer 220. Further, in some embodiments, the check value 230 may directly follow the return pointer 220 onto the stack 200. Alternatively, in some embodiments, the check value 230 may directly precede the return pointer 220 onto the stack 200.

In one or more embodiments, the CCALL instruction 115 may also generate the check value 230 based on the salt value 119. For example, in some embodiments, the CCALL instruction 115 may generate the check value 230 based on a function of one or more of the return pointer 220, the stack pointer 240, the stored salt value 119, or any combination thereof. In some embodiments, such a function may include one or more cryptographic algorithms, and may thus serve to encrypt the salt value 119 within the check value 230. An example process for generating the check value 230 is described below with reference to FIG. 2D.

Figure 2B:
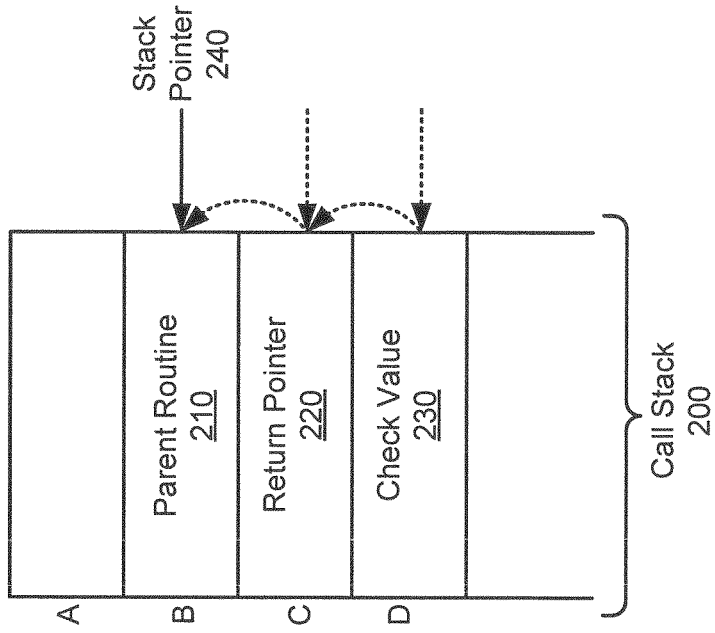
FIGS. 2A-2D are diagrams of examples in accordance with one or more embodiments.
Figure 2A:
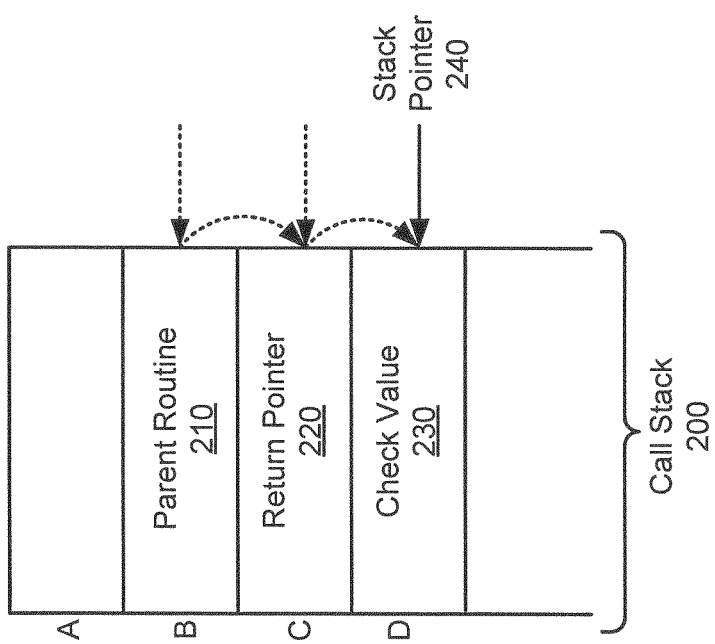
Figure 2C:
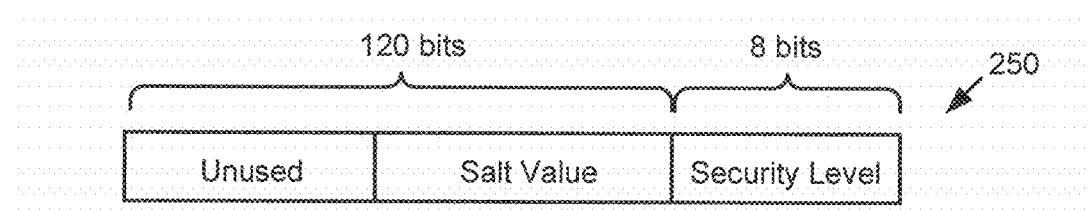

Referring now to FIG. 2B, assume that the final portion of the subroutine includes the CRET instruction 116. Assume further that the subroutine has completed, and thus the CRET instruction 116 is executed. In one or more embodiments, the CRET instruction 116 pops the check value 230 off the stack 200. Accordingly, as shown in FIG. 2B, the stack pointer 240 moves from the check value 230 to the return pointer 220 (i.e., from position D to position C). Further, in some embodiments, the CRET instruction 116 also pops the return pointer 220 off the stack 200, and moves the stack pointer 240 to position B.

In one or more embodiments, the CRET instruction 116 includes functionality to determine whether the check value 230 is based on the salt value 119, and thereby verify that it has not been tampered with or produced in an unauthorized manner (e.g., not generated by a CCALL instruction 115). In some embodiments, the CRET instruction 116 may generate a new check value (referred herein to as a "validation check value") in the same manner used by the CCALL instruction 115 to generate the check value 230 stored on the stack 200.

In one or more embodiments, the CRET instruction 116 may also compare the validation check value to the check value 230 removed from the stack 200. If they match, the associated return pointer 220 may be assumed to be valid. Thus, in this situation, the CRET instruction 116 may complete the return to the parent routine as specified in the return pointer 220. Accordingly, as shown in FIG. 2B, the return pointer 220 may be popped off the stack 200, and the stack pointer 240 moves back to the parent routine 210 (i.e., from position C to position B).

However, in the event that the CRET instruction 116 determines that the validation check value does not match the check value 230 removed from the stack 200, the associated return pointer 220 may be assumed to be invalid (e.g., a part of a ROP attack). Accordingly, in this situation, the CRET instruction 116 may not complete the return to the parent routine as specified in the return pointer 220. Instead, in some embodiments, execution may be halted, and exceptions may be raised.

Referring again to FIG. 1B, in some embodiments, the CPUSH instruction 117 and the CPOP instruction 118 may be restricted for use by the OS 135. In one or more embodiments, the CPUSH instruction 117 may enable the OS 135 to generate the check value 230 based on the salt value 119, and to push the check value 230 onto the stack 200. In some embodiments, the CPUSH instruction 117 may generate the check value 230 in a similar manner to that described above with reference to the CCALL instruction 115. In one or more embodiments, the CPUSH instruction 117 and/or the CPOP instruction 118 may use an operand for ROP security level.

In one or more embodiments, the CPOP instruction 118 may enable the OS 135 to pop the check value 230 off the stack 200, and to validate the check value 230 against the stored salt value 119. In some embodiments, the CPUSH instruction 117 may validate the check value 230 in a similar manner to that described above with reference to the CRET instruction 116. In one or more embodiments, the OS 135 may use the CPUSH instruction 117 and/or the CPOP instruction 118 to maintain and/or update any check values 230 stored on the stack 200. For example, assume that the salt value 119 is forced to be updated during a given session (e.g., due to an error). In such a situation, the OS 135 may use the CPUSH instruction 117 and/or the CPOP instruction 118 to revise any check values 230 included in the stack 200 to reflect the new salt value 119.

Figure 2D:
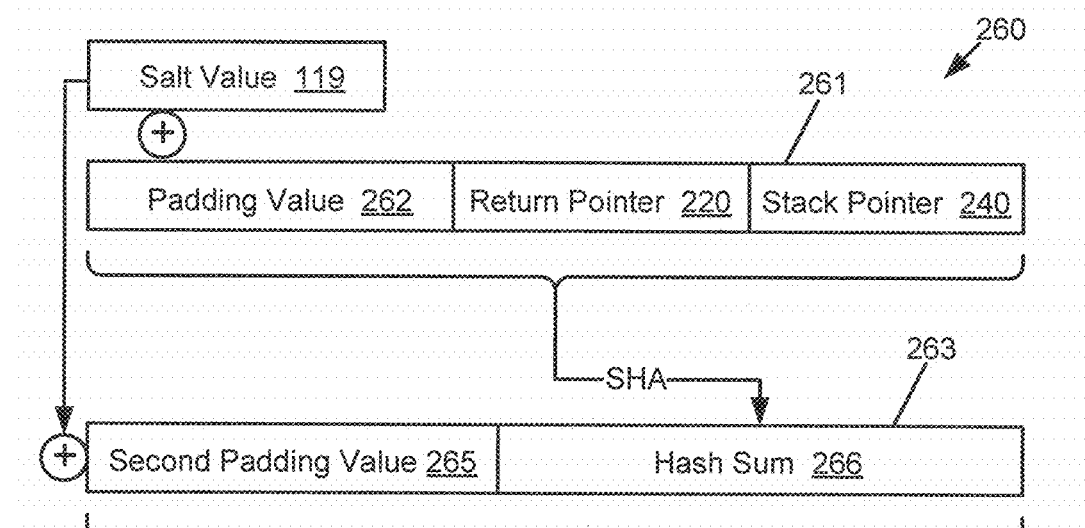

Referring now to FIG. 2D, shown is an example process 260 for generating the check value 230, in accordance with one or more embodiments. As shown, in this example, the process 260 begins by combining the salt value 119 with an operand 261 including a padding value 262, the return pointer 220, and the stack pointer 240. The combined operand 261 is then be processed through a Secure Hash Algorithm (SHA) to obtain the hash sum 266. Further, the salt value 119 may be combined with a second padding value 265. As shown, the combined second padding value 265 and the hash sum 266 may be included in a second operand 263. In this example, the second operand 263 is then processed through a SHA to obtain the second hash sum 267. Finally, the second hash sum 267 is compressed to obtain the check value 230. Note that the example shown in FIG. 2D is only provided for the sake of illustration, and is not intended to limit any embodiments. For example, it is contemplated that the check value 230 may be generated using any combination of the salt value 119, the return pointer 220, the stack pointer 240, and/or any other value (or a portion thereof). Further, it is contemplated that the check value 230 may be generated using any type of algorithm (e.g., encryption/cryptography, hashing, cyclic redundancy check, etc.). Furthermore, in some embodiments, the check value 230 may be generated with varying levels of security based on the ROP security level, system performance, and/or implementation cost.

Figure 3A:
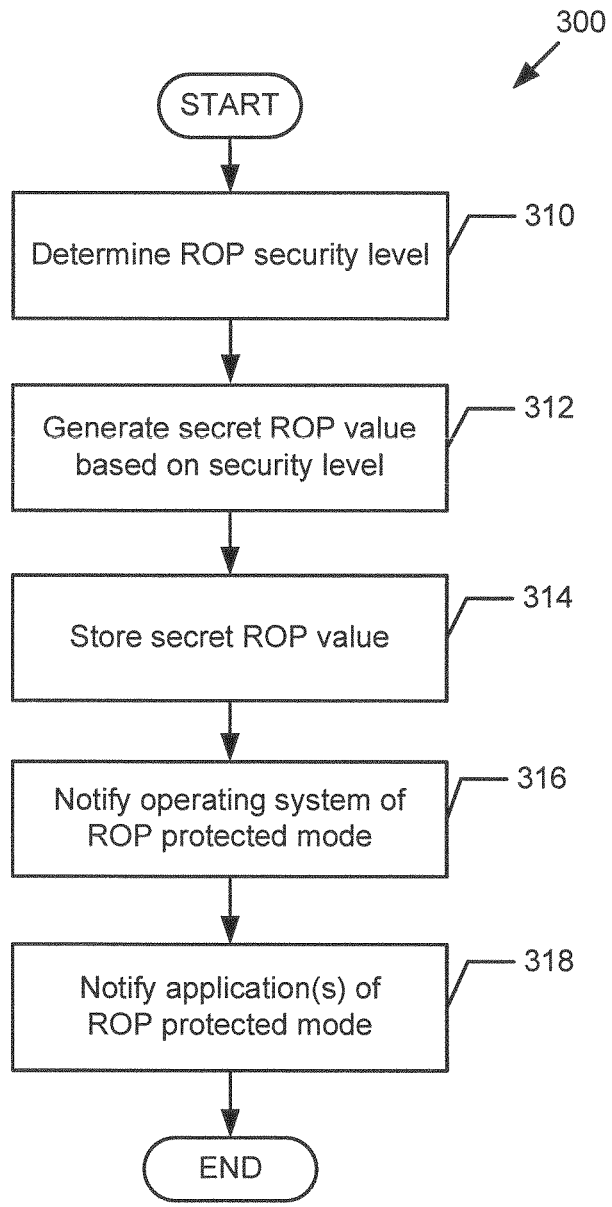
FIGS. 3A-3B are sequences in accordance with one or more embodiments.

Referring now to FIG. 3A, shown is a sequence 300 for initiating a ROP protected mode, in accordance with one or more embodiments. In one or more embodiments, the sequence 300 may be part of the ROP logic 112 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device.

In one or more embodiments, the sequence 300 may be performed at system start-up or instantiation. Further, in some embodiments, the sequence 300 may be performed only if a processor control flag (e.g., a control register or feature flag bit) indicates that the ROP logic 112 is enabled.

At step 310, an ROP security level is determined. For example, referring to FIG. 1A, the ROP logic 112 may determine a ROP security level. In one or more embodiments, this determination may be based on the levels of functionality associated with the ROP logic 112 and/or the OS 135.

At step 312, a secret ROP value is generated based on the ROP security level (determined at step 310). For example, referring to FIG. 1B, the LSALT instruction 113 may generate the salt value 119 based on a random number or function.

At step 314, the secret ROP value is stored. For example, referring to FIG. 1B, the SSALT instruction 114 may store the salt value 119 in a secure location that is only accessible to the OS 135 (e.g., ring 0). Thus, in some embodiments, the applications 145 cannot access the salt value 119. Further, in some embodiments, the salt value 119 may also be stored in one or more fields associated with context switching (e.g., XSAVE, XSAVEOPT, XRSTOR, etc.).

At step 316, the operating system may be notified that a ROP protected mode is available. For example, referring to FIG. 1A, the ROP logic 112 may notify the OS 135 that the use of checked returns is available for ROP protection. In one or more embodiments, this notification may use a dedicated processor feature flag (e.g., a first CPUID flag).

At step 318, one or more applications may be notified that a ROP protected mode is available. For example, referring to FIG. 1A, the ROP logic 112 may notify the applications 145 that the use of checked returns is available for ROP protection. In one or more embodiments, this notification may use a dedicated processor feature flag (e.g., a second CPUID flag). After step 318, the sequence 300 ends.

Figure 3B:
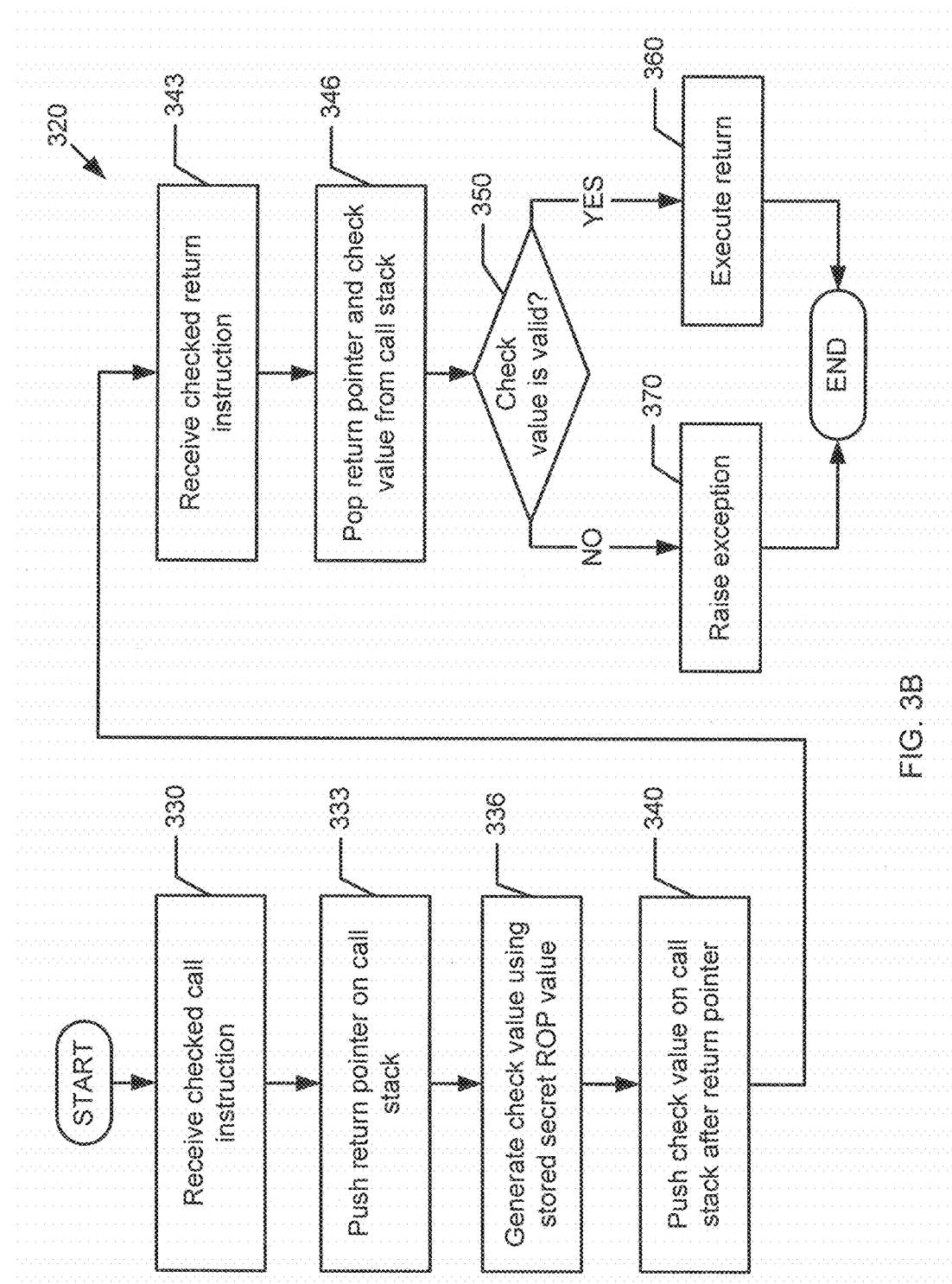

Referring now to FIG. 3B, shown is a sequence 320 for ROP protection, in accordance with one or more embodiments. In one or more embodiments, the sequence 320 may be performed after a ROP protection mode is initialized (e.g., after completing sequence 300 shown in FIG. 3A).

In one or more embodiments, the sequence 320 may be part of the ROP logic 112 shown in FIG. 1A. The sequence 320 may be implemented in hardware, software, and/or firmware. In firmware and software embodiments it may be implemented by computer executed instructions stored in a non-transitory computer readable medium, such as an optical, semiconductor, or magnetic storage device.

At step 330, a checked call instruction to a subroutine is received. For example, referring to FIGS. 1A-1B, the processor 110 may receive a CCALL instruction 115 from an application 145 (e.g., ring 3).

At step 333, a return pointer is pushed onto the call stack. In one or more embodiments, the return pointer may indicate a code address or location which execution is to return to after completing the called subroutine. For example, referring to FIGS. 1B and 2A, the CCALL instruction 115 (received at step 330) may push a return pointer 220 onto the call stack 200.

At step 336, a check value may be generated using a stored secret ROP value. In one or more embodiments, the stored secret ROP value may be obtained using the sequence 300 shown in FIG. 3A. For example, referring to FIGS. 1B and 2A, the CCALL instruction 115 (received at step 330) may generate the check value 230 based on the salt value 119. Further, in some embodiments, the check value 230 may be generated by encrypting any combination of the salt value 119, the return pointer 220, and/or the stack pointer 240.

At step 340, the check value may be pushed onto the call stack after the return pointer. For example, referring to FIGS. 1B and 2A, the CCALL instruction 115 may push a check value 230 onto the call stack 200 after the return pointer 220.

At step 343, a checked return instruction may be received. For example, referring to FIGS. 1A-1B, the processor 110 may receive a CRET instruction 116. In one or more embodiments, the CRET instruction 116 may be included in a final portion of the subroutine (called at step 330). Thus, the CRET instruction 116 may be received as execution of the subroutine is completed.

At step 346, the return pointer and the check value may be popped off the call stack. For example, referring to FIGS. 1B and 2B, the CRET instruction 116 (received at step 343) may pop the return pointer 220 and the check value 230 off the call stack 200.

At step 350, a determination may be made about whether the check value is valid. For example, referring to FIGS. 1B and 2B, the CRET instruction 116 (received at step 343) may determine whether the check value 230 is valid. In one or more embodiments, this determination may involve generating a validation check value using the same process as that used to generate the check value 230, and comparing the validation check value to the check value 230.

If it is determined at step 350 that the check value is valid, then at step 360, the return instruction is completed, and the sequence 320 ends. For example, referring to FIGS. 1B and 2B, the CRET instruction 116 may determine that the secret value extracted from the check value 230 matches the stored salt value 119, and may thus continue execution at a program location specified in the return pointer 220.

However, if it is determined at step 350 that the check value is not valid, then at step 370, the return instruction is not completed, and an exception is raised. For example, referring to FIGS. 1B and 2B, the CRET instruction 116 (received at step 343) may determine that the validation check value does not match the check value 230, and may thus raise an exception to indicate a possible ROP attack. After step 370, the sequence 320 ends.

Note that the examples shown in FIGS. 1A-1B, 2A-2D, and 3A-3B are provided for the sake of illustration, and are not intended to limit any embodiments. For example, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of components in addition to those shown, and that different arrangement of the components shown may occur in certain implementations. Further, it is contemplated that specifics in the examples shown in FIGS. 1A-1B, 2A-2D, and 3A-3B may be used anywhere in one or more embodiments.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440 and various interfaces 450.

Although not shown for ease of illustration in FIG. 4, in some embodiments, each of the cores 410a-410n may include the ROP logic 112 shown in FIG. 1A-1B. Alternatively, in some embodiments, the ROP logic 112 may be included in the uncore domain 420, and may thus be shared across the cores 410a-410n.

With further reference to FIG. 4, the processor 400 may communicate with a system memory 445, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
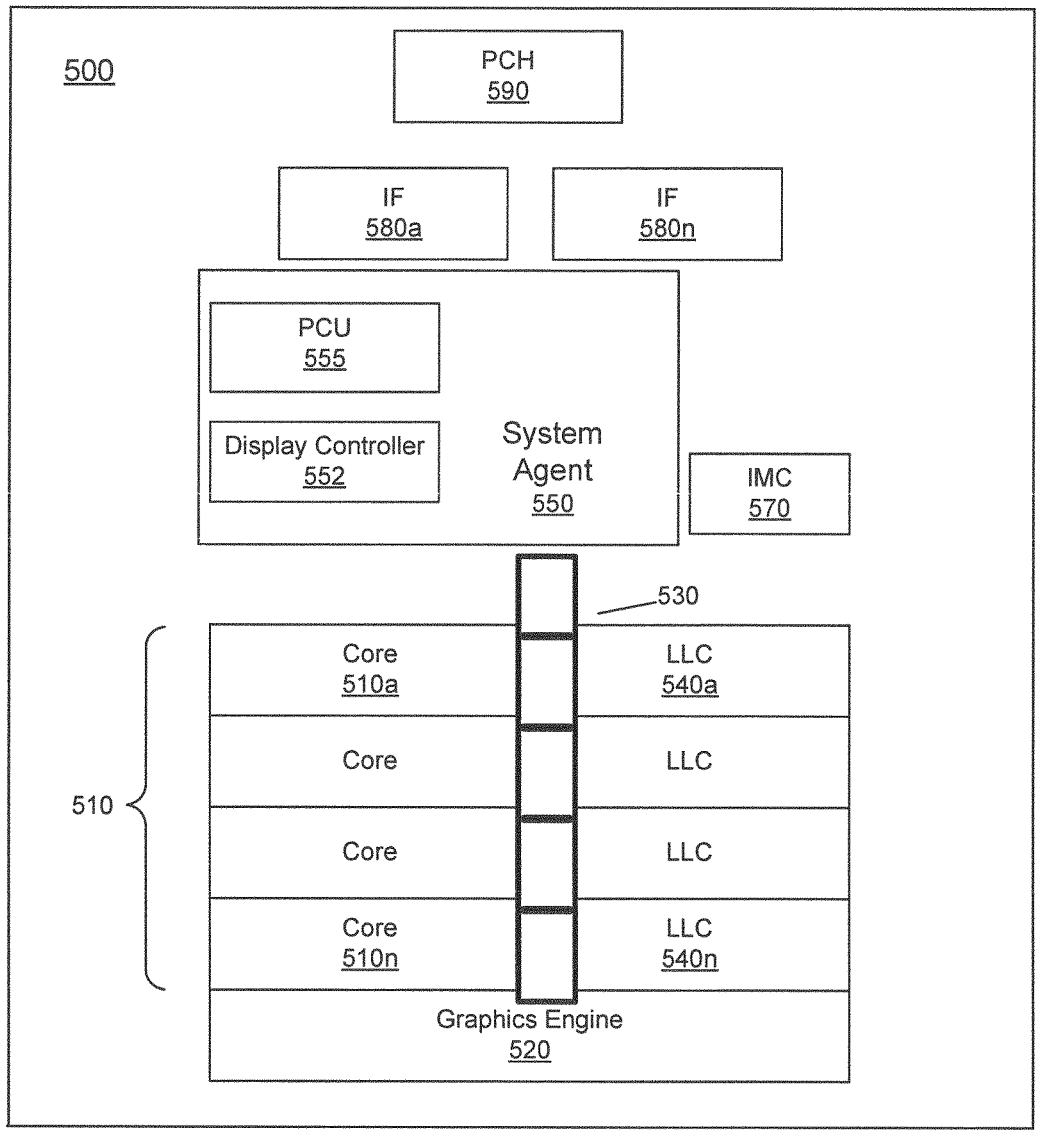
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 550 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, understand the scope of the present invention is not limited in this regard.

Figure 6:
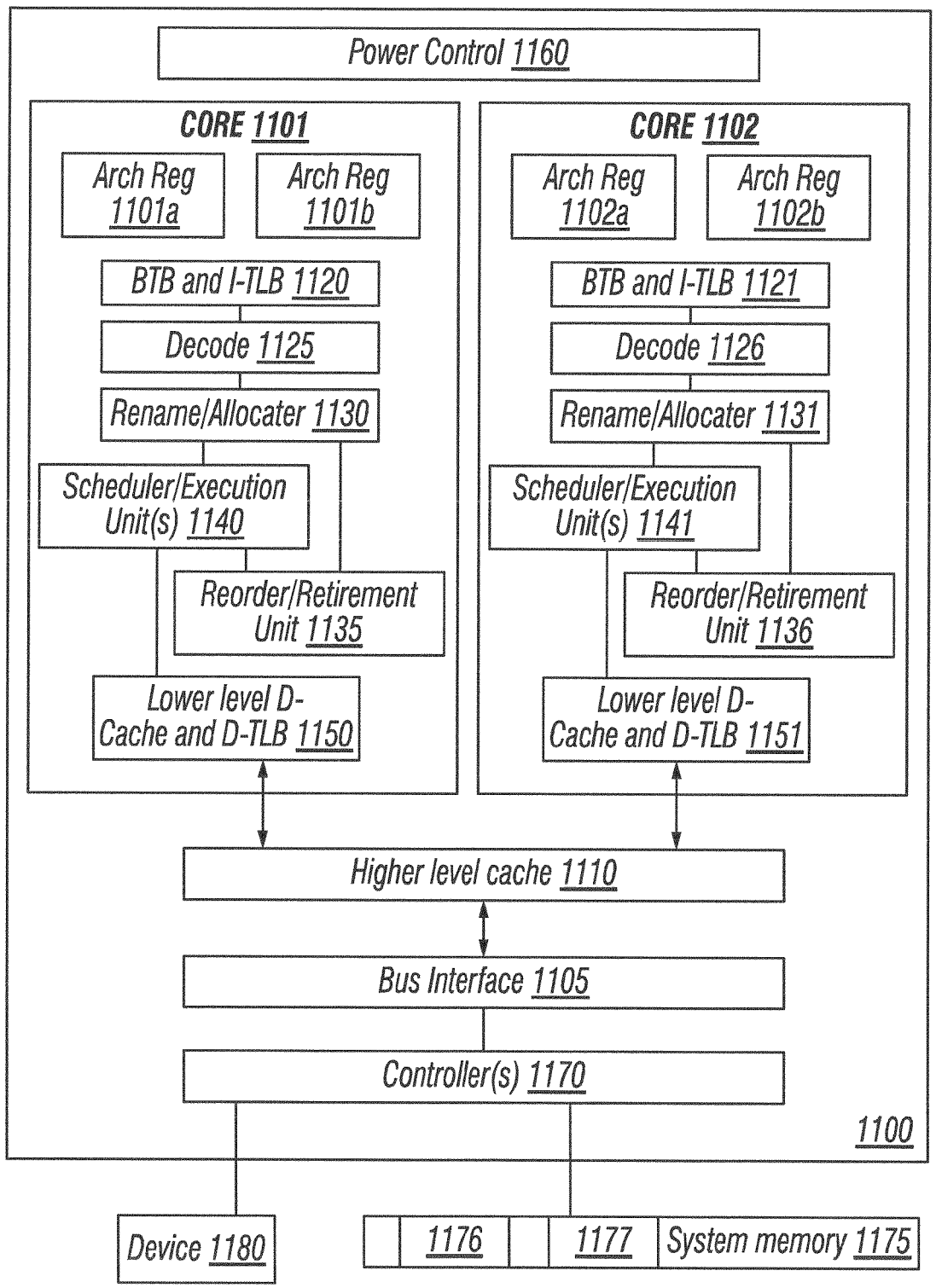
FIG. 6 is a block diagram of an embodiment of a processor including multiple cores is illustrated.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as the instructions 113-118 included in the ROP logic 112 shown in FIG. 1B. As a result of the recognition by decoders 1125, the architecture or core 1101 takes specific, predefined actions to perform tasks associated with the appropriate instruction (e.g., the actions shown in FIGS. 3A-3B). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
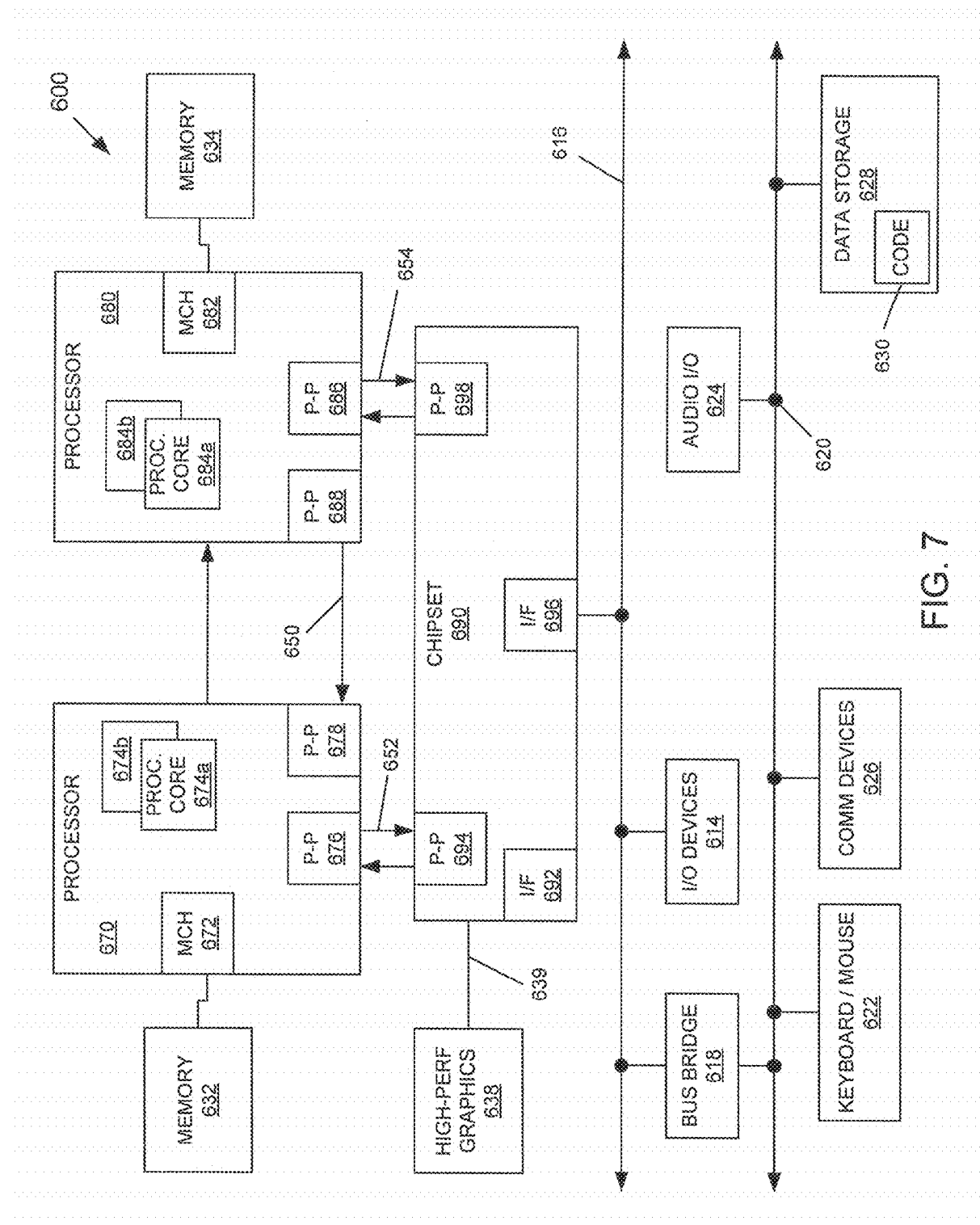
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors. Each of the processors can include the ROP logic 112 described above with reference to FIGS. 1A-1B.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein.

The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands.

In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Embodiments may use any data type, format, and/or arrangement. For example, data types may include packed byte, packed word, and/or packed doubleword (dword) formats. In one example, a packed byte format may, e.g., be 128 bits long and contain sixteen packed byte data elements. A byte may be 8 bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase a storage efficiency of the processor. As well, when sixteen data elements are accessed, one operation can be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element.

In one example, a packed word format may be 128 bits long and contain eight packed word data elements. Each packed word contains sixteen bits of information. In another example, a packed doubleword format may be 128 bits long and contain four packed doubleword data elements. Each packed doubleword data element contains thirty two bits of information. In still another example, a packed quadword may be 128 bits long and contain two packed quad-word data elements.

In some embodiments, each packed data can include more than one independent data element. For example, packed data formats may include packed half, packed single, packed double, etc. Such packed data formats may contain fixed-point data elements or floating-point data elements. A packed half format may, e.g., be one hundred twenty-eight bits long and contain eight 16-bit data elements. A packed single format may, e.g., be one hundred twenty-eight bits long and contain four 32-bit data elements. A packed double format may, e.g., be one hundred twenty-eight bits long and contain two 64-bit data elements. It will be appreciated that such packed data formats may be further extended to other register lengths, for example, to 96-bits, 160-bits, 192-bits, 224-bits, 256-bits or more.

In some embodiments, a processor core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a processor including: at least one execution unit; and a Return Oriented Programming (ROP) logic coupled to the at least one execution unit, the ROP logic to validate a return pointer stored on a call stack based on a secret ROP value, where the secret ROP value is only accessible to an operating system. The ROP logic may generate the secret ROP value under control of an operating system. The ROP logic may generate the secret ROP value using a random number. The ROP logic may generate a check value based on the secret ROP value. The ROP logic may push the check value on the call stack after the return pointer. The ROP logic may generate the check value by encryption of the secret ROP value with the return pointer. The ROP logic may generate the check value by encryption of the secret ROP value with a stack pointer. The ROP logic may pop the check value and the return pointer off the call stack, and to extract the secret ROP value from the check value. The ROP logic may determine that the return pointer is valid when the secret ROP value extracted from the check value matches a stored secret ROP value. The ROP logic may execute a return to a first routine via the return pointer if the return pointer is valid.

Another example embodiment may be a processor comprising at least one core to execute a check return instruction to: pop a return pointer and a check value off a call stack; determine whether the check value is based on a secret Return Oriented Programming (ROP) value; and in response to determining that the check value is based on the secret ROP value, validate that the return pointer is not part of a ROP attack. The at least one core may execute a checked call instruction to push the return pointer and the check value onto the call stack. The checked return instruction and the checked call instruction may be accessible to application level software. The checked call instruction may generate the check value based on the secret ROP value. The at least one core may execute a load instruction to generate the secret ROP value. The at least one core may execute a store instruction to store the secret ROP value in a secure location. The load instruction and the store instruction are not accessible to application level software.

Yet another example embodiment may be a method including: obtaining a check value and a return pointer from a call stack stored in a memory; determining whether the check value is valid based on a secret Return Oriented Programming (ROP) value; and upon determining that the check value is valid, executing a return pointer, wherein the check value is associated with the return pointer. The method may also include generating the check value using the secret ROP value in response to a call for a subroutine. The method may also include storing the return pointer and the check value on the call stack. Obtaining the check value from the call stack may be performed in response to completing the subroutine. The method may also include generating the secret ROP value based on a ROP security level. The method may also include determining the ROP security level based on a level of ROP functionality of a processor. The method may also include determining the ROP security level based on a level of ROP functionality of software. The method may also include, upon determining that the check value is not valid, raising an exception without execution of the return pointer.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
    at least one execution unit;
    a Return Oriented Programming (ROP) logic comprising at least one hardware circuit and coupled to the at least one execution unit, the ROP logic to:
        pop a return pointer and a check value off a call stack;
        determine whether the check value was generated from a secret ROP value, wherein the secret ROP value is only accessible to an operating system, the secret ROP value to be generated at a beginning of a session and stored in a secure location, the secret ROP value corresponding to a salt value and to be generated based on a ROP security level; and
        in response to determining that the check value was generated from the secret ROP value, validate that the return pointer is not part of a ROP attack; and
    a control register including at least one bit to indicate whether the ROP logic is enabled.

2. The processor of claim 1, wherein the ROP logic is to generate the secret ROP value under control of an operating system.

3. The processor of claim 2, wherein the ROP logic is to generate the secret ROP value using a random number.

4. The processor of claim 1, wherein the ROP logic is to generate the check value based on the secret ROP value and at least one of the return pointer and a stack pointer.

5. The processor of claim 1, wherein the ROP logic is further to store the check value on the call stack after the return pointer.

6. The processor of claim 1, wherein the ROP logic is to generate the check value by encryption of the secret ROP value with the return pointer.

7. The processor of claim 4, wherein the ROP logic is to generate the check value by encryption of the secret ROP value with a stack pointer.

8. The processor of claim 5, wherein the ROP logic is further to remove the check value and the return pointer from the call stack, and to generate a validation check value.

9. The processor of claim 8, wherein the ROP logic is to determine that the return pointer is valid when the validation check value matches the check value removed from the call stack.

10. The processor of claim 9, wherein the ROP logic is further to execute a return to a first routine via the return pointer if the return pointer is valid.

11. A processor comprising:
    at least one core to execute a checked return instruction to:
        pop a return pointer and a check value off a call stack;
        determine whether the check value was generated from a secret Return Oriented Programming (ROP) value, wherein the secret ROP value is only accessible to an operating system and is to be generated at a beginning of a session and stored in a secure location, the secret ROP value corresponding to a salt value and to be generated based on a ROP security level; and
        in response to determining that the check value was generated from the secret ROP value, validate that the return pointer is not part of a ROP attack,
    wherein the at least one core comprises at least one hardware component and a control register including at least one bit to indicate whether a ROP logic is enabled.

12. The processor of claim 11, wherein the at least one core is further to execute a checked call instruction to push the return pointer and the check value onto the call stack.

13. The processor of claim 12, wherein the checked return instruction and the checked call instruction are included in an Instruction Set Architecture (ISA) of the processor.

14. The processor of claim 12, wherein the checked call instruction is further to generate the check value based on the secret ROP value.

15. The processor of claim 14, wherein the at least one core is further to execute a load instruction to generate the secret ROP value.

16. The processor of claim 15, wherein the at least one core is further to execute a store instruction to store the secret ROP value in a secure location.

17. The processor of claim 16, wherein the load instruction and the store instruction are not accessible to application level software.

18. A method, comprising:
    obtaining, via a Return Oriented Programming (ROP) logic of a processor, a check value and a return pointer from a call stack stored in a memory, wherein the processor comprises a control register including at least one bit to indicate whether the ROP logic is enabled;
    determining whether the check value was generated from a secret ROP value, wherein the secret ROP value is only accessible to an operating system and is to be generated at a beginning of a session and stored in a secure location, the secret ROP value corresponding to a salt value and to be generated based on a ROP security level; and
    upon determining that the check value was generated from the secret ROP value, executing the return pointer, wherein the check value is associated with the return pointer.

19. The method of claim 18, further comprising generating the check value using the secret ROP value in response to a call for a subroutine.

20. The method of claim 19, further comprising storing the return pointer and the check value on the call stack.

21. The method of claim 19, wherein obtaining the check value from the call stack is performed in response to completing the subroutine.

22. The method of claim 19, further comprising determining the ROP security level based on a level of ROP functionality of the processor.

23. The method of claim 22, wherein determining the ROP security level is further based on a level of ROP functionality of software.

24. The method of claim 18, further comprising, upon determining that the check value is not valid, raising an exception without execution of the return pointer.

* * * * *